Figures 1, 2:
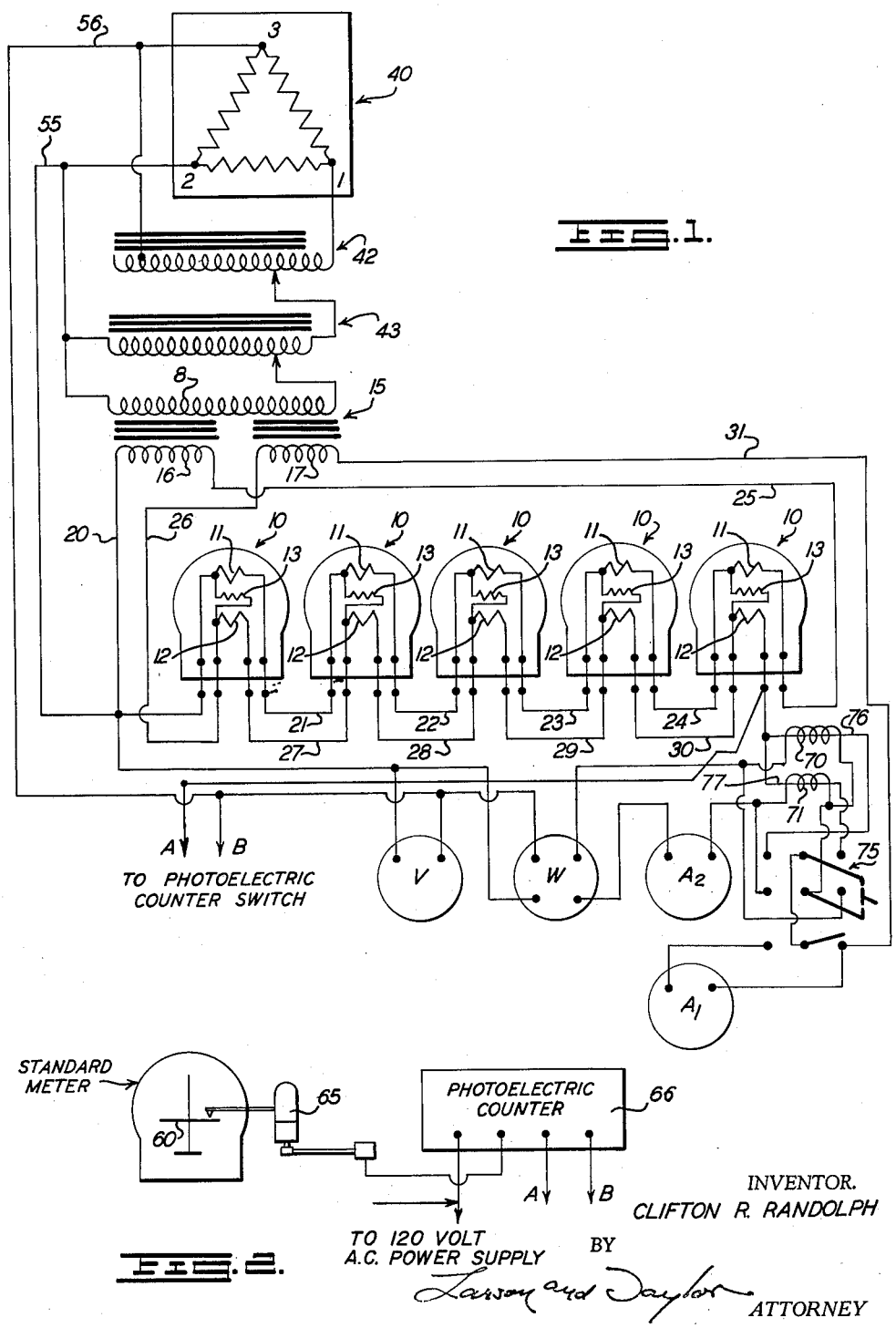

June 20, 1961     C. R. RANDOLPH     2,989,696
WATT-HOUR METER TESTING CIRCUIT
Filed April 9, 1959

STANDARD METER

PHOTOELECTRIC COUNTER

TO 120 VOLT A.C. POWER SUPPLY

INVENTOR.
CLIFTON R. RANDOLPH
BY
Larson and Taylor
ATTORNEY

United States Patent Office

2,989,696
Patented June 20, 1961

2,989,696
WATT-HOUR METER TESTING CIRCUIT
Clifton R. Randolph, 924 35th St.,
West Palm Beach, Fla.
Filed Apr. 9, 1959, Ser. No. 805,245
7 Claims. (Cl. 324—74)

This invention relates to electrical energy-meter testing equipment for testing watt-hour meters and the like. It is mandatory that watt-hour meters be periodically tested and adjused to insure their accuracy and many circuit arrangements have been developed in the prior art to make such tests. In recent years, more and more attention has been given to gang testing of meters in the interests of economy and efficiency and many complex test boards have been developed to test the meters with a minimum of operations by the meterman. As will later be more fully described, the instant invention relates to a circuit usable with a gang-testing board wherein a heretofore important operation in the testing of three-wire type meters is eliminated.

The three-wire watt-hour meter has therein two current carrying coils and a single potential coil bridged across the terminals of the current coils. Test clips are provided in the terminal block of these meters which are openable by a tester to isolate the potential coil when the usual periodic test is being made so that the burden, or phantom load, applied to the pair of current coils will be isolated from the potential coil and a separate source of potential energy is applied to the potential coil with the clips in an open position. This is a troublesome procedure and is conductive to errors in that the tester may forget to close the test clips when he has completed the work and the meter will then be in an inoperative condition when it is installed in the customer's lines.

It is accordingly a broad object of my invention to improve on the meter testing procedure now known.

It is another and more specific object of my invention to provide a circuit for testing watt-hour meters wherein a series of transformers is provided to supply current to the current coils, and further connections are provided from a source of energy to energize the potential coil with the potential coil test clip in a closed position.

It is another object of this invention to employ an arrangement of circuit components such that a number of operations performed on a meter during tests is kept to a minimum.

It is a still further object of this invention to provide a watt-hour meter testing circuit which is an improvement over the testing circuits now in use.

Other objects of this invention will appear in the following specification wherein reference is made to the accompanying drawings, in which like reference characters refer to like parts, and in which:

FIGURE 1 is a schematic wiring diagram showing the arrangement of apparatus embodying this invention as used for testing single phase three-wire watt-hour meters; and FIGURE 2 is a schematic arrangement showing the application of a photo-electric counter to a standard reference meter usable in the circuit of FIGURE 1.

It has been pointed out that one of the objects of this invention is to provide a circuit wherein the potential coil test clips may be maintained in a closed position during bench testing of a three-wire watt-hour meter. In the description that hereinafter follows, the assembly will be considered a testing arrangement for a plurality or gang of meters, which, as is well known, is an efficient and economical way of determining the accuracy of registration of a watt-hour meter. Referring now to FIGURE 1, reference character 10 indicates a series of watt-hour meters which may be any number in accordance with the physical design of the test board to be used with this circuit and having the usual pair of current coils 11 and 12 and potential coils 13 connected across the terminals of the current coils in the usual manner. As is there shown, the respective current coils are all connected in series from the secondary of a transformer 15 having a primary 8 and a pair of econdary windings 16 and 17; secondary 16 being connected to conductor 20 and to one side of upper current coil II of the first meter in the series. Conductors 21, 22, 23, and 24 connect the respective upper current coils in series, and conductor 25 completes the loop to the other side of secondary 16. Conductor 26 connects between one side of secondary 17 and the lower current coil 12 of the first meter in the series, and conductors 27, 28, 29, and 30 are dependent upon to interconnect the remaining lower current coils 12 of the series of meters; and conductor 31 completes the loop to the other side of secondary 17.

Referring now to the upper part of the drawing, reference character 40 designates a three phase 60-cycle 240 volt delta connected source of electrical energy having terminals 1, 2 and 3 designated for the convenience of identification. A phasing auto transformer 42 is connected across terminals 1 and 3 of the power supply; and a loading auto transformer 43 is connected between transformer 42 and terminal 2 of the power supply. The above-mentioned transformer 15 is connected, in its primary 8, between transformer 43 and terminal 2 of the power supply 40. Thus a power supply is provided for the testing circuit which yields adjustable loading and power factor control.

Meters V, W, $A_2$, and $A^1$, are respectively an indicating volt meter, watt meter, ammeter for high and intermediate currents and ammeter for small currents. This array of instruments are used in conjunction with a pair of instrument transformers and a pair of switches 75 for monitoring the circuit during test setup and during running of the tests. In practice the upper current transformer is rated 200/5 amperes and has its primary 76 connected in the watt hour meter current coil circuit as there shown and to the top left hand terminal of the double pole double throw switch. The primary 77 of the lower current transformer, which is rated at 50/5 amperes, is connected to the right hand top terminal of the same switch. The top blade of the switch, then, serves to switch from one transformer to another for high or intermediate range; and the center terminal is connected to the center terminal of the single pole double throw switch which is connected between the two current transformer ranges and direct reading ammeter $A_2$, for measurement of light loads. The bottom poles of the double throw switch are connected respectively to the secondaries 70 and 71 of the current transformers to thereby connect the selected transformer secondary to the instruments and simultaneously short circuit the secondary of the transformer not selected; thus in any position of the two switches the current transformer secondaries are either short circuited or connected through meter elements. The single pole double throw switch completes the current circuit from either one of the current transformers or the direct reading ammeter $A_2$. The above-described circuit, by including a pair of instrument transformers and one low scale ammeter, extends the testing range of the circuit greatly. In practice using this circuit tests may be run from 240 watts to 48,000 watts, which range includes extended range thermal demand meters.

Conductors 55 and 56 also join between terminals 2 and 3 of the source of energy 40 and respective terminals of the current coils 11 and 12 to thereby energize the several potential coils 13. It will be noted that conductor 56 has a junction indicated B to connect a photo-electric counter switch A, B, which will be explained in connection with the description of FIGURE 2, but it will be easily seen that if a switch is bridged across between A and B then conductor 56 connects one side of the current coil 12 and potential coil 13 to the source of energy 40 (terminal 3). In the above-described circuit the secondaries of transformer 15 separate and electrically isolate the meter current coils from the source of energy 40 so that conductors 55 and 56, which directly energize the several potential coils (through the photo-electric counter switch), make it possible to leave the meter test clips closed during test. It has been found that there is no interference with the measured watts on the meter under test. In a test board constructed in accordance with the invention there are twelve positions, one of which is used for the standard meter, which leaves eleven positions. This, however, is not intended as a limitation but merely as an example of the operation of this circuit.

FIGURE 2 illustrates a photo-electric counter which may be used with the circuit of FIGURE 1. It will be understood that the standard meter may be one of the meters indicated by reference character 10 in the circuit of FIGURE 1 and has the usual disc 60, having marks thereon for cooperation with a photo-electric pick-up 65. The counter device 66 and the arrangement shown is of well-known construction and terminals A, B in this figure are intended to be connected to terminals A, B in FIGURE 1, and connect to a switch within the counter 66. It is customary to connect the standard meter coils in series with the coils of the meters under test as shown in FIGURE 1. The photo-electric pick-up 65 responds to the markings on disc 60 and transmits impulses to the counter relay which starts the meters under test by closing a switch to terminals A, B and thereby applying potential to the meter potential coils. The meters are stopped when a predetermined number of revolutions of the disc on the standard meter have been made in the usual way by opening the potential circuit.

The above-described circuit makes it possible to make all tests with three-wire meter test clips in closed position which saves time by eliminating the operations of opening and closing the same and obviates the likelihood of the meter's going into service inoperative. The isolated current circuits make it possible to accomplish, with a very simple circuit, every test function which has been realized from more expensive and complex circuits and permits full utilization of all the inherent accuracy from a photo-electric counter, a stable loading circuit and position power factor control.

This circuit has been thoroughly tested in service and it has been found to be extremely accurate. Numerous comparisons have been made with a group of meters tested in the above-described circuit and then transferred to and tested on single position electronically controlled test tables and in every test the registration has been exactly the same.

The circuit disclosed herein is also usable to test three wire single phase thermal demand meters of all ratings up to, at the present time, 48 kw. The circuit has been thoroughly tested on this type of meter and the power supply disclosed which insures positive power factor control and stable loading provides ease of test and great accuracy.

While I have shown one embodiment of a circuit in which the watt hour meters may be connected and tested and the object of the invention thereby accomplished, I prefer to be limited not by the disclosure herein contained but only by the appended claims.

I claim:

1. A circuit for use in the simultaneous testing of a plurality of three wire watthour meters, comprising in combination a source of electrical energy, at least one transformer connected to said source, a second transformer connected to said first recited transformer and having a pair of secondary windings, a series of meters including a plurality of meters to be tested and a standard meter, two pairs of conductors interconnecting between the secondaries of the second transformer and the terminals of the end meters of the series, means to connect the respective current carrying coils of the meters in series, and a pair of conductors joining between the source of energy and predetermined ones of the conductor pairs to energize the respective meter potential coils so that the voltage across the potential coil is the same for each of the meters.

2. A circuit for use in the simultaneous testing of an assemblage of series connected three wire watthour meters wherein the connections of the potential coil is maintained in the normal in use condition comprising in combination a source of electrical energy, a variable transformer connected to said source, a second transformer having a pair of secondaries connected to said variable transformer, a series of meters including a plurality of meters to be tested and a standard meter, first conductor means electrically connecting the secondaries of the second transformer to each end of the series of meters to load the current coils and second conductor means electrically connecting the source of energy with predetermined ones of said first conductor means to energize the potential coils so that the voltage across the potential coil is the same for each of the meters.

3. An apparatus for simultaneously testing a series connected array of watt hour meters and having a standard meter and a photo-electric system for determining the accuracy of the meters comprising in combination a source of alternating current energy, a first variable ratio translating device connected to said source of energy for phase angle control, a second variable ratio translating device connected to the said first variable ratio translating device for loading control, a series connected array of meters, an assemblage of indicating instruments interconnected in the circuit under test to respectively reveal the voltage, current and wattage values of the circuit under test, a fixed ratio translating device having a pair of secondaries connected to said second variable ratio translating device, conductor means electrically connecting the secondaries of the said fixed ratio translating device and the said source of energy to the series connected array of meters to load the current coils and to energize the potential coils.

4. The invention as set forth in claim 3 wherein the said indicating instruments are connected to the said conductor means.

5. The invention as set forth in claim 4 wherein the said conductor means comprises two pairs of conductors connected respectively to each secondary and to each end of the series connected meters and connectors joining the energy source with each of the conductor pairs.

6. The invention as set forth in claim 5 wherein the said assemblage of indicating instruments includes a pair of indicating ammeters, a pair of instrument transformers, and a switching circuit connected between the transformers and meters whereby a user may select a predetermined meter and transformer to monitor a test cycle.

7. An apparatus for testing watt hour meters comprising a series of meters including a plurality of untested meters and a standard meter, each of said meters having a potential coil and first and second current coils, a source of alternating current energy, a transformer having a primary winding connected across said source and a pair of secondary windings, the first current coils of the series of meters being series connected with one of the secondary windings, the second current coils of the series of meters being series connected with the other of the secondary windings with an opposite polarity, one terminal of the first current coil of the first of the series of meters and one terminal of the second current coil of the last of the series of meters being connected across the source of energy whereby the voltage across the potential coil of each of the meters is the same.

References Cited in the file of this patent

UNITED STATES PATENTS

| | | |
|---|---|---|
| 1,587,841 | Knopp | June 8, 1926 |
| 2,557,314 | Robison | June 19, 1951 |
| 2,586,008 | Davis | Feb. 19, 1952 |
| 2,599,378 | Fleischmann | June 3, 1952 |

OTHER REFERENCES

"Wattmeter Testing," article in Electrical Review, March 2, 1945, pages 317–318.

"Thermal Demand Watthour Meters Gang-Tested and Checked," article in Electrical World, April 23, 1949, pages 79–82.